July 8, 1941.  H. O. ROOSENSTEIN  2,248,466
BAND PASS COUPLING NETWORK
Filed Sept. 17, 1938
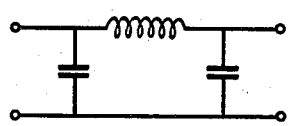
Fig. 1
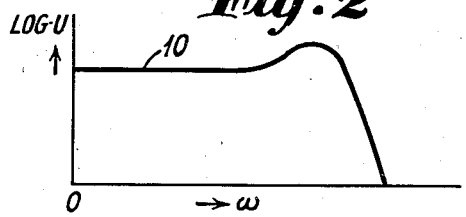
Fig. 2
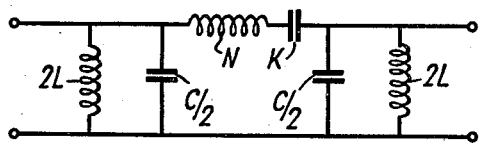
Fig. 3
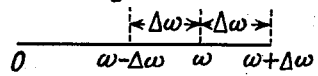
Fig. 4
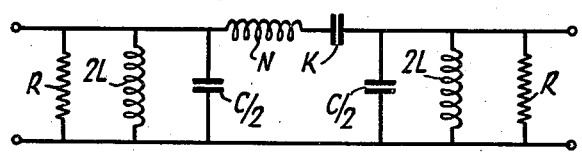
Fig. 5
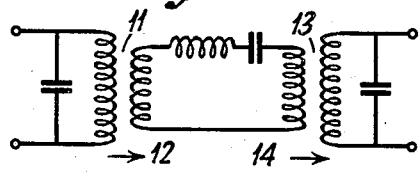
Fig. 7
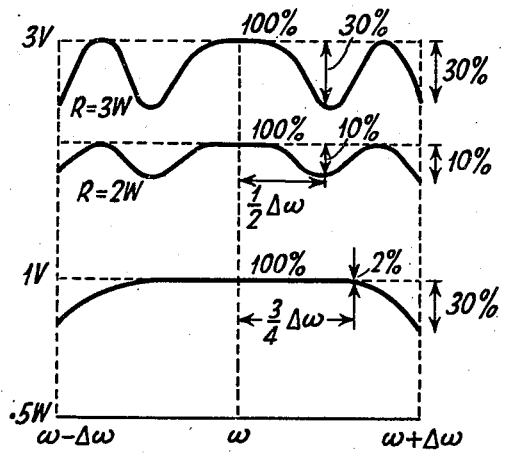
Fig. 6
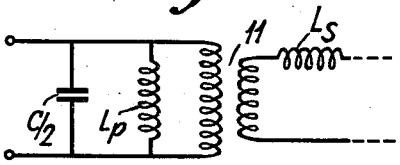
Fig. 8
Fig. 9
INVENTOR
HANS O. ROOSENSTEIN
BY
ATTORNEY Patented July 8, 1941

UNITED STATES PATENT OFFICE 2,248,466

2,248,466

BAND PASS COUPLING NETWORK

Hans Otto Roosenstein, Berlin-Tempelhof, Germany, assignor to Telefunken Gesellschaft für Drahtlose Telegraphie m. b. H., Berlin, Germany, a corporation of Germany Application September 17, 1938, Serial No. 230,383
In Germany September 18, 1937

2 Claims. (Cl. 178—44)

For the purpose of intercoupling two amplifier tubes it is known in the art to use a filter or mesh structure of the kind shown in Fig. 1 which comprises two shunt or cross-arm capacitors and a line-arm or series inductance, the shunt capacitors consisting of the plate-filament capacitance of the first and the grid-filament capacitance of the second amplifier tube. The frequency characteristic of such a coupling means has a form as roughly shown by graph 10, Fig. 2, where the frequency in radians $\omega$ (abscissae) is plotted against the logarithm of the grid potential U of the second tube, in the presence of constant grid potential of the first tube, represented by the ordinate.

To the end of matching a capacitive load or consumer to an amplifier tube furnishing an RF band, the invention discloses a circuit organization in which in parallel relation to the load and to the tube is connected a current resonance circuit tuned to the center of the transmitted band or pass-band, the capacity of the said current resonance circuit consisting in whole or in major part of the input capacity of the consumer and the plate-filament capacitance of the tube respectively, while the connecting line of these two current resonance circuits includes a potential resonance circuit which is also tuned to the center of the band to be passed.

An arrangement of this nature will always offer advantages over the above-mentioned circuit organization known in the prior art. For it will be understood that the new circuit organization here disclosed, in transmitting an RF band from a tube to a consumer or load may be used in such a way that inside the band to be passed equal differences in the frequency response may be obtained as in the scheme known in the art, but combined with a far higher voltage yield. But the circuit organization here disclosed may also be employed in such a way that the same potential yield is secured as in the earlier arrangement combined with an unequally better frequency response inside the band to be transmitted. It will be understood, of course, that it is also feasible to secure a compromise between the two advantages, that is, both a better potential performance together with greater uniformity or smoothness of the frequency characteristic.

In the drawing, Fig. 1 is a filter circuit of known form, and Fig. 2 is the frequency characteristic of such circuit. Figs. 3 and 5 are band pass coupling networks according to the invention, Figs. 4 and 6 are explanatory diagrams, and Figs. 7 to 9 are modifications of certain portions of the circuits shown in Figs. 3 and 5.

The improved network or filter structure is represented in Fig. 3. The shunt capacities and the shunt inductances are denoted, respectively, by $$\frac{C}{2}$$

and 2L, while the line or series inductance and the line capacity are designated by N and K, respectively. In choosing the dimensions of the various meshes of this network, one proceeds as follows:

The capacity of the right-hand shunt or cross unit is to consist wholly or in major part of the input capacity of the load and is therefore assumed to be fixed. The corresponding inductance is so proportioned that the right-hand cross or shunt mesh is tuned to center-band resonance, that is to say, to the carrier frequency in the case where a carrier with two side-bands is dealt with. Similarly, the left-hand cross or shunt unit is tuned to resonance since the capacity of this cross unit is regarded to consist of the plate-filament capacitance of the tube and is thus also fixed, the inductance being again proportioned in such a way that also the left-hand cross or shunt unit will come to be in resonance with the center of the band. The line member is then also tuned to be in resonance with the center of the band. However, it is only the product of K and N that is fixed, while the size of K and N to result in a constant product is not yet determined. Now, for the surge impedance W of the entire network, for center-band, there hold good the following two equations:

$$\frac{N}{C} = W^2$$

and $$W = \frac{1}{\epsilon \omega C}$$

where $\omega$ is the frequency in radians at the center of the band and $\epsilon$ is:

$$\epsilon = \frac{\Delta \omega}{\omega}$$

where $\omega \pm \Delta \omega$ the limiting or cutoff frequencies of the network as shown in Fig. 4. On the basis of these equations, it is thus feasible first to ascertain the surge or characteristic impedance for the center of the band, and thence the value of N. It follows that in this manner also the dimension for the line or series member is unequivocally fixed.

The two extreme instances hereinbefore referred to, namely, a satisfactory frequency characteristic at the expense of, or with lower potential yield, or else a high potential yield combined with a less satisfactory frequency response, are realized by choosing suitable dimensions for the ohmic terminating resistance of the network and an ohmic resistance to be connected in parallel to the input cross member, the latter resistance, for the sake of simplicity, to be denoted also as a terminating resistance. These two terminating resistances are denoted by R in Fig. 5, which, as to the rest, corresponds to Fig. 3. Now, the situation here is as follows: With increasing size of the terminating resistances, the frequency response is initially improved until an optimum value is obtained, with simultaneous increase in the voltage yield. This, however, is followed by an impairment of the frequency characteristic as the terminating resistances are increased in size and as the voltage yield is further improved.

In a certain practical case, for the logarithm of voltage U at the consumer or load, within the radio-frequency band under consideration, there resulted a form as shown in Fig. 6. For the sake of a better discussion of the frequency characteristic, the voltage yield in the middle of the channel has been designated by 100 percent. Now, the influence of the value or size of the terminating resistances is as follows: The bottom curve holds good for $R=W$. It shows that the frequency response of the central portion about mid-channel is extremely good. At a distance amounting to about ¾ of one-half the width, figured from the center, the voltage yield, as will be noted, is only about 2 percent less than in the center, and it is only for the last quarter of one-half the width that the gain drops to around 70 percent. Choosing $R=2W$, there results a crevass at about the center of the half width, though this amounts to only 10 percent of the ordinate in the middle, followed by a rise of the curve to the 100-percent mark. There is another drop near the cut-off amounting to 10 percent. In other words, there is securable a far higher voltage yield than in the case where $R=W$, and the frequency characteristic is improved. Making $R=3W$, the crevass grows to a value equal to about 30 percent its value in the middle, and also the decline near the cut-off limit is around 30 percent. However, the voltage yield again exhibits an appreciable improvement over what it was for $R=2W$. In other words, for average conditions, there is an advantage to choose the terminating resistances higher than W, preferably about twice as high as the surge impedance.

However, in the attempt to use the new network in connection with frequency bands of the kind customary in television work, there results a practical difficulty which shall be explained in what follows by the aid of a numerical example: The output capacity of the tube and the input capacity of the load, if the latter consists of an amplifier or the Braun cathode-ray tube of a television receiver, approximates 4 pF (where 1 pF or picofarad$=10^{-6}$ micro-farads). Suppose the mid-channel is at 8 mc., while the lower and the upper cut-off points are at 6 and 10 mc., respectively. The surge impedance of the network then amounts to 10,000 ohms and the terminating resistance, say, to 20,000 ohms. If, then, by the aid of the above formulae the line inductance N is calculated, there results $8\times10^{-4}$ henry and for the line capacity K around ½ pF. But this capacity falls below the self-capacitance of the coil N. But this means nothing else but that the line arm is quite unable to act as a voltage resonance circuit, but that, in practice, it represents only the series connection of two capacities.

In order to obviate this difficulty, according to a further object of the invention, the potential is stepped down below the series arm, and stepped up above the series arm. In other words, recourse is had to a circuit arrangement of the kind shown in Fig. 7. By this transforming scheme the above difficulties are obviated, for the reason that the capacities in the low-voltage circuit have a value in the high-voltage circuit which is multiplied by the square of the transformation ratio. For instance, if transformer 11 has a transformation ratio of 10:1 in the direction of the arrow 12 and the transformer 13 has a transformation ratio of 1:10 in the sense of the arrow 14, then the capacity of the line arm, on the basis of the above-mentioned numerical relations, must be equal to .5 pF. $(10:1)^2=50$ pF. And this value of 50 pF is sufficiently great compared with the self-capacitance of the coil N in order that the effect of the line arm, from the viewpoint of voltage resonance, may be assured.

These conditions hold good first only for strayless transformers, while in a case where the transformer leakage is to be taken into consideration also, a slight correction will be in order. Transformer 11, Fig. 7, may be replaced by a strayless transformer of the kind shown in Fig. 8. The secondary winding of this transformer is connected in series with an inductance $L_s$, while the primary winding thereof is connected in parallel with an inductance $L_p$. The latter in conjunction with C/2 must then be in resonance with the mid-channel, while in the line arm of the network, it is inductance $N+L_s$ rather than inductance N which is tuned to resonance with capacity K.

In using a transformer, care must be taken so that the primary and the secondary windings are wound in the same sense. For in such case, a comparatively small voltage difference will prevail across points A and B in Fig. 9, since the potential across the primary winding and the potential across the secondary winding will then be in phase. Hence, also the mutual capacitance of the windings which may be imagined to be lumped between points A and B in order to represent the distributed mutual capacitance is charged at a somewhat lower voltage than in the inverse sense of winding. The lower ends of the two windings are assumed to be grounded for this consideration.

What I claim is:

1. A band-pass filter network for coupling a capacitive source to a capacitive load comprising a parallel tuned circuit connected to the source, a parallel tuned circuit connected to the load, a series tuned circuit connected between high potential points of said parallel tuned circuits, the low potential points of said parallel circuits being connected together, all of said circuits being tuned to the mid-frequency of the band to be passed, and a terminating resistor for improving the voltage response of the band passed frequencies associated with one of the parallel tuned circuits, said resistor having a value sufficiently higher than the surge impedance of the network to reduce to a minimum the departure of the voltage response within the pass band from its mid band value.

2. A band-pass filter network according to claim 1 wherein the capacities of the parallel tuned circuits comprise respectively the capacity of the source and that of the load, and wherein the terminating resistor is of a value substantially twice the surge impedance of the network.

HANS OTTO ROOSENSTEIN.